3 Sheets—Sheet 1.
VAUGHN, CHADWELL, CHILDRESS & WEBBER.
Alcohol Still.
No. 79,926. Patented July 14, 1868.
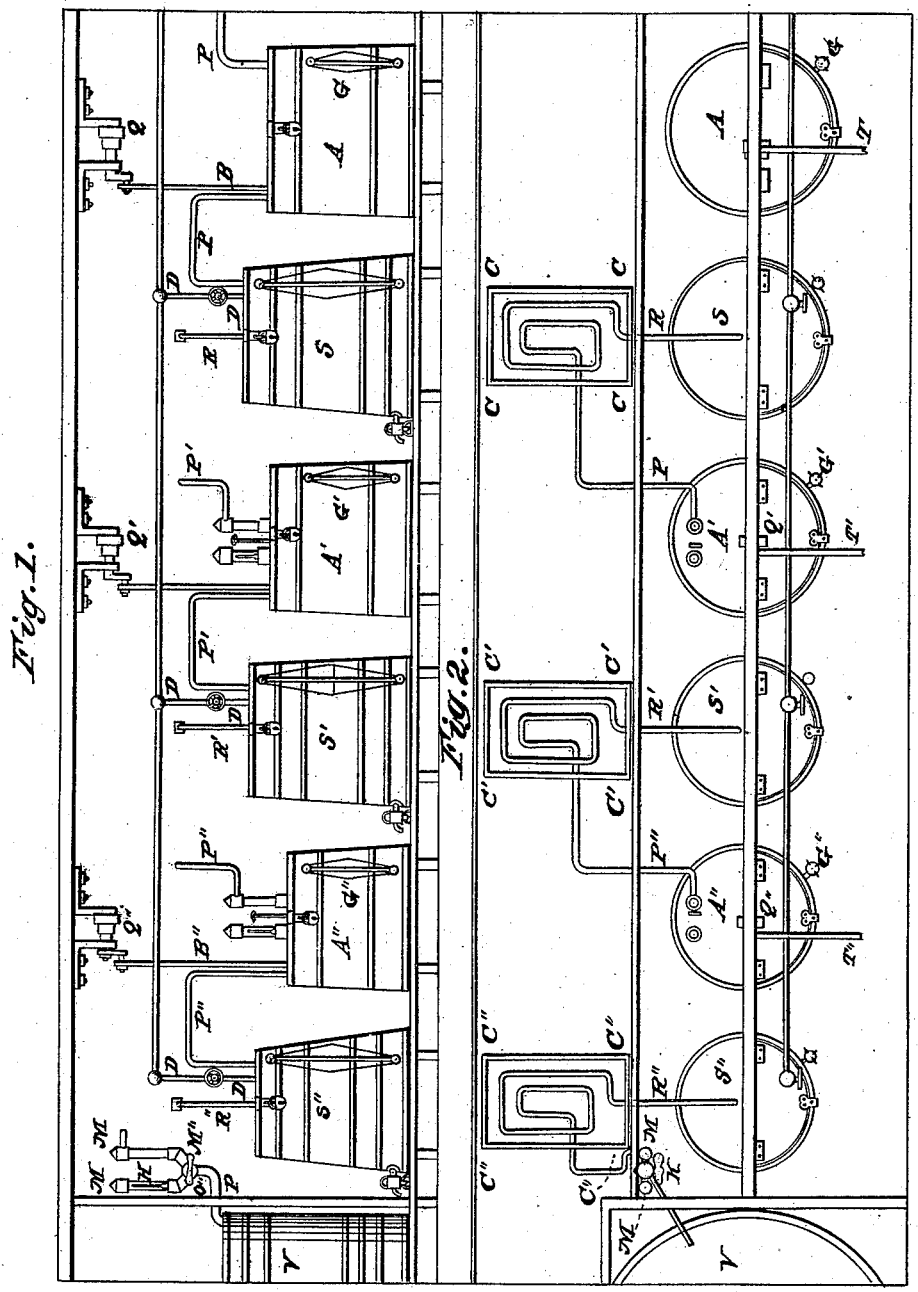
Witnesses:
Geo H Smith
Inventors:
Hiram Vaughan
Thomas Chadwell
E H Childress
G H Webber 3 Sheets—Sheet 2.
VAUGHN, CHADWELL, CHILDRESS & WEBBER.
Alcohol Still.
No. 79,926. Patented July 14, 1868.
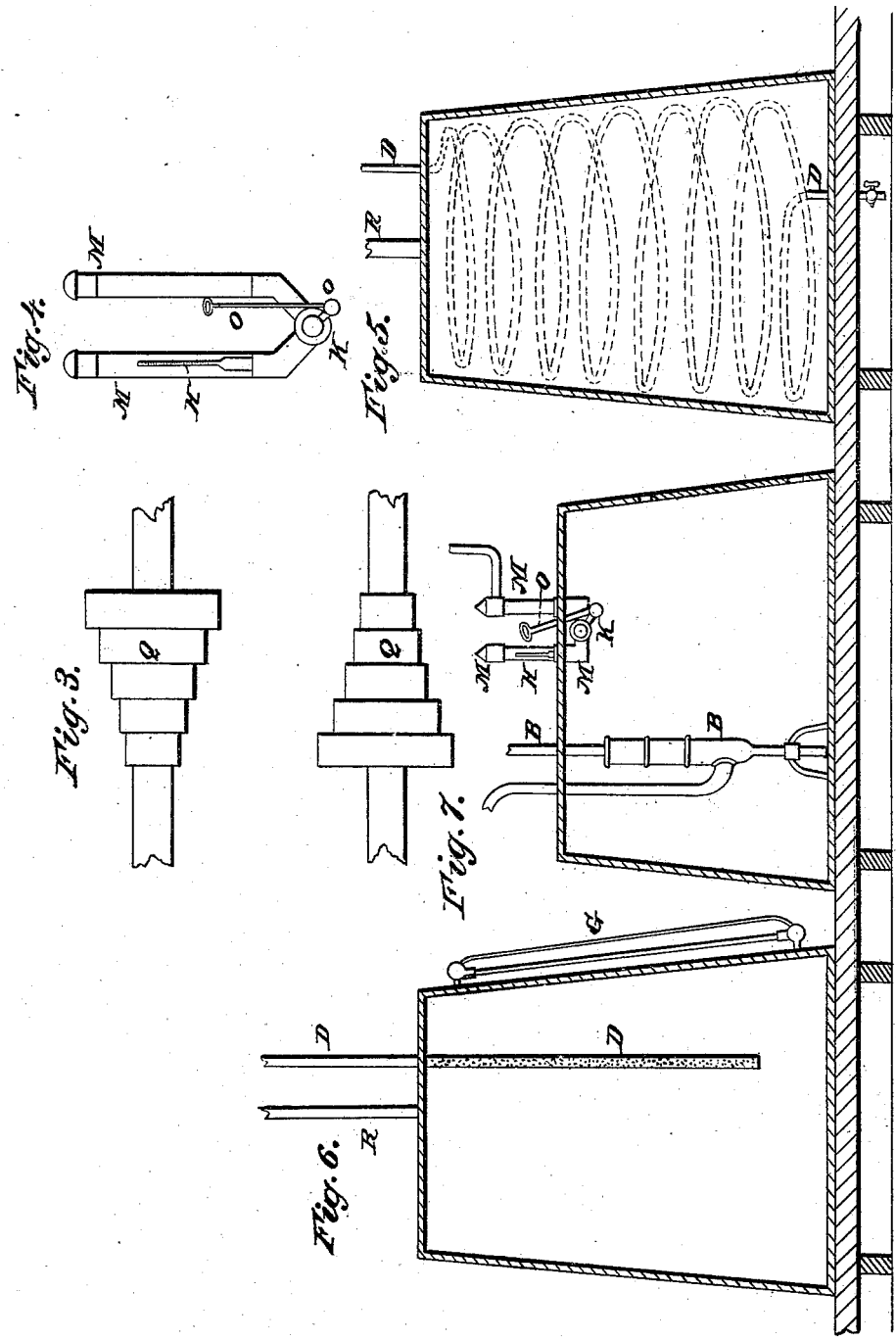
Witnesses:
Inventors:

3 Sheets—Sheet 3.
VAUGHN, CHADWELL, CHILDRESS & WEBBER.
Alcohol Still.
No. 79,926. Patented July 14, 1868.
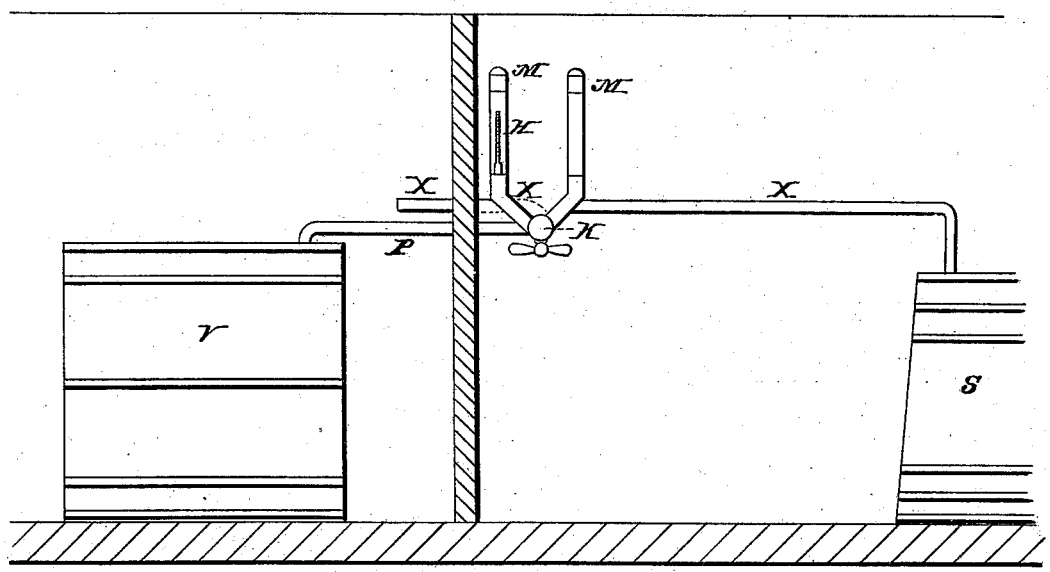
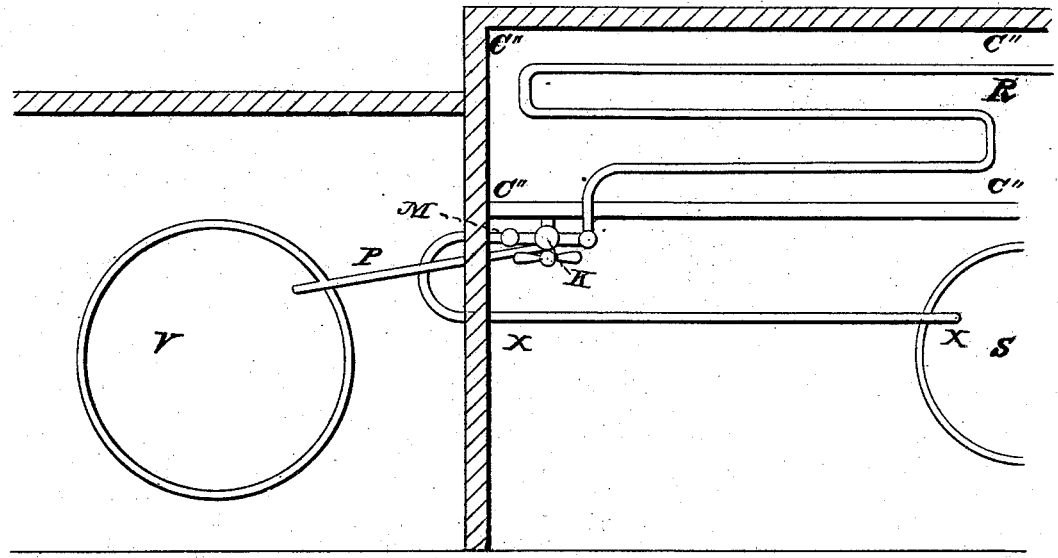
Witnesses:
Inventors.

United States Patent Office.

HIRAM VAUGHN, THOMAS CHADWELL, E. H. CHILDRESS, AND G. A. WEBBER, OF NASHVILLE, TENNESSEE.

Letters Patent No. 79,926, dated July 14, 1868; antedated July 2, 1868.

IMPROVED APPARATUS FOR THE MANUFACTURE OF WHISKEY.

*The Schedule referred to in these Letters Patent and making part of the same.*

TO ALL WHOM IT MAY CONCERN:

Be it known that we, HIRAM VAUGHN, THOMAS CHADWELL, E. H. CHILDRESS, and G. A. WEBBER, of Nashville, in the county of Davidson, and State of Tennessee, have invented a new and improved Mode of Manufacturing Whiskey, in accordance with the law on the matter; and we do hereby declare that the following is a full and exact description of the same.

The nature of our invention consists in providing our stills and vats with a complete system of pipes, pumps, hydrometers, gauges, and padlocks, in such a disposition, and in using them in such a manner, as to enable us to manufacture our whiskey out of our reach, its degree of improvability being always under our control, and its quantity under the control and the lock of the revenue-officers, according to the spirit of the law.

In order to enable others skilled in the art to make and use our invention, we will proceed to describe its construction and operation.

We construct our vats, A A' A'' A''', and stills, S S' S'' S''', of wood or other material, with their ordinary appendages, but we furnish the first still, A, or beer-still, with a pipe, through which it receives the mash from the fermenting-tub. We also provide the said beer-still with a steam-pipe, through which it is heated, and with another pipe, we call evaporating-pipe, by means of which, when conveniently heated, the liquor evaporates and goes in the condenser.

All other stills are provided with padlocks, steam-pipe, evaporating-pipe, and gauge, by means of which the liquid is kept secured, heated, evaporated, and its level in the still always ascertained. Also, we furnish said stills with a cock, placed at their bottom, to take off the water and charcoal, after the operation; said cock fastened by a padlock.

All vats are furnished, first, with a pump, worked by any power whatever, through which the liquor is taken from it to the next still; second, with a hydrometer, by means of which the grade of the liquor is ascertained. Said hydrometer is enclosed in an apparatus, M, composed of two glass tubes, one of them being connected with the pipe through which runs the liquor, when condensed, from the refrigerator to the vat, and in which, in turning the cock K, the liquor is kept, and ascends in the other glass tube, permitting the hydrometer to float in it, it allows to read through the glass the grade of the liquor.

We also provide the last apparatus of our hydrometer with an additional pipe, for the purpose of taking the liquor from that apparatus to the third still, when its grade is pronounced too low, and distilling it again. This we do by turning the cock K in a convenient manner.

The pipe connected with the apparatus, M, containing the hydrometer, is the continuity of the evaporating-pipe, in which the liquor enters in a vapor from the stills, and comes out in a liquid form in vats, after having been condensed in the refrigerator.

We also furnish all cocks and openings with a padlock adopted by the internal-revenue officer, and all hinges and hasps of all openings of our stills and vats are fastened by bolts having the nuts inside of the vessels.

The above being established, let us proceed to explain the operation of our manufacture.

The sour mash being taken by a pump from the fermenting-tub, goes to the first still or beer-still, where it is heated, and, evaporating, goes through the pipe P into the condenser c, where it condenses and comes out in a liquid form and into the first vat, A. When a sufficient quantity has been running, the pump B is put in motion, either by steam, through the system of pulleys and straps, E E', or by other means, and the liquor is taken from the vat A to the second still or doubling, where, by the gauge a, it is ascertained that a sufficient quantity is contained in the still. The still is heated either by steam or by any other means, and the liquor evaporating goes through the evaporating-pipe P' into the condenser, from which it comes out, in a liquid form, in the second vat.

All that has been said for the first vat will take place in the second. The liquor will be taken through the pump in the third still, there it will be heated, evaporated, condensed, &c., until it goes to the last cistern, V, which, according to the law, is kept in a separate room, of which the revenue-officer has the key.

From vat to vat, by means of the hydrometer H, the grade of the spirit may be ascertained, and if, by the last hydrometer, it is seen that its grade is too weak, by turning the cock K in such a manner, the liquor, instead of running in the last cistern, comes to the three vats to be distilled again.

In our drawings—

Figures 1 and 2 represent the plan and elevation of our manufacturing-apparatus.

Figures 3, 4, 5, 6 represent section of pulleys, vats, stills, and

The last drawing represents a plan and elevation of the apparatus M, with the additional pipe to take the liquor from it to the third vat when its grade is judged too weak.

*Claim.*

1. The process hereinbefore described of manufacturing whiskey, or any kind of spirit whatever, by the employment of pipes, pumps, hydrometers, gauges, padlocks, substantially as described.

2. The manner herein described of employing pipes, pumps, hydrometers, gauges, padlocks, as set forth.

3. The method of working said pumps, pipes, hydrometers, either by steam or other power whatever, and using them in combination with gauges and padlocks, in the manner and for the purposes set forth.

HIRAM VAUGHN,
THOMAS CHADWELL,
E. H. CHILDRESS,
G. A. WEBBER.

Witnesses:
Oscar W. Sloan,
H. de Salusse Lussac.

Note.—Our manufacture is generally intended for the sour-mash process for obtaining whiskey.